(12) United States Patent
Bhatia et al.

(10) Patent No.: US 12,124,734 B2
(45) Date of Patent: Oct. 22, 2024

(54) METHOD AND SYSTEM TO PROCESS DATA DELETE IN VIRTUALIZED COMPUTING

(71) Applicant: VMware LLC, Palo Alto, CA (US)

(72) Inventors: Kashish Bhatia, Bengaluru (IN);
Randhir Singh, Bengaluru (IN);
Kamal Jeet Charan, Bengaluru (IN);
Akshay Jindal, Mumbai (IN);
Prasanna Aithal, Bengaluru (IN)

(73) Assignee: VMware LLC, Palo Alto, CA (US)

( * ) Notice: Subject to any disclaimer, the term of this patent is extended or adjusted under 35 U.S.C. 154(b) by 56 days.

(21) Appl. No.: 17/943,142

(22) Filed: Sep. 12, 2022

(65) Prior Publication Data

US 2024/0086103 A1 Mar. 14, 2024

(51) Int. Cl.
*G06F 3/06* (2006.01)

(52) U.S. Cl.
CPC .......... *G06F 3/0656* (2013.01); *G06F 3/0613* (2013.01); *G06F 3/0673* (2013.01)

(58) Field of Classification Search
CPC .... G06F 3/0604; G06F 3/0655; G06F 3/0679; G06F 12/0848; G06F 2212/152; G06F 12/0811; G06F 12/084; G06F 12/0842; G06F 12/0862; G06F 2201/885; G06F 2209/504; G06F 2212/1016; G06F 2212/502; G06F 2212/6024; G06F 9/5016
See application file for complete search history.

(56) References Cited

U.S. PATENT DOCUMENTS

2011/0099233 A1* 4/2011 Calder .................... G06F 9/546
709/206
2013/0318196 A1* 11/2013 Yamamoto .......... G06F 12/0893
709/215

* cited by examiner

*Primary Examiner* — Yong J Choe
(74) *Attorney, Agent, or Firm* — King Intellectual Asset Managememt (57) ABSTRACT

Example methods and systems to process input/output (I/O) requests in a distributed storage system in a virtualized computing environment are disclosed. One example method includes executing a first thread to destage one or more data writes, wherein the one or more data writes correspond to a first bucket; executing a second thread to destage the one or more data deletes, wherein the one or more data deletes correspond to a second bucket; in response to executing the first thread, buffering write I/Os associated with the one or more data writes in a logical queue; in response to executing the second thread, buffering delete I/Os associated with the one or more data deletes in the logical queue; and adjusting a number of slots in the logical queue dedicated to buffer the delete I/Os based on a relationship between the first bucket and the second bucket.

21 Claims, 3 Drawing Sheets

METHOD AND SYSTEM TO PROCESS DATA DELETE IN VIRTUALIZED COMPUTING

BACKGROUND

Unless otherwise indicated herein, the approaches described in this section are not admitted to be prior art by inclusion in this section.

Virtualization allows the abstraction and pooling of hardware resources to support virtual machines (VMs) in a virtualized computing environment. For example, through server virtualization, virtualized computing instances such as VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

In a distributed storage system, storage resources of a cluster of hosts may be aggregated to form a single shared pool of storage. VMs supported by the hosts within the cluster may then access the pool to store data. The data is stored and managed in a form of data containers called objects or storage objects. An object is a logical volume that has its data and metadata distributed in the distributed storage system.

The distributed storage system generally uses a tiered architecture to manage input/output (I/O) associated with the objects. The tiered architecture may include a primary tier (i.e., Tier-1 or cache tier) and a secondary tier (i.e., Tier-2 or capacity tier). The performance of the primary tier is faster than the performance of the secondary tier. For example, the primary tier may include one or more solid state drives (SSD) and the secondary tier may include one or more slower hard disk drives (HDD). Incoming I/Os are written on the primary tier first and later move to the secondary tier from the primary tier. When I/Os are moved to the secondary tier, spaces in the primary tier are freed up. In other words, the distributed storage system implements a storage stack that asynchronously moves I/Os from the primary tier to the secondary tier and frees up spaces in the primary tier. By freeing up spaces in the primary tier, new incoming I/Os may be continuously written into the primary tier.

One challenge of the storage stack is to efficiently handle "delete I/Os," which refer to an operation of deleting I/Os. One expectation for delete I/Os is to free up storage spaces quickly so that the freed-up spaces can be reused for other purposes. Assuming delete I/Os are not processed in time, the storage space will not be freed up and a subsequent write I/O is required to wait until the processing of the delete I/O is completed, resulting in the delayed processing of the subsequent write I/O. The challenge is further aggravated in the tiered architecture set forth above because the delete I/Os need to go through the primary tier first and then the secondary tier. Therefore, additional improvements of the storage stack are needed to enhance efficiencies of processing delete I/Os in a virtualized computing environment.

DETAILED DESCRIPTION

In some embodiments, the disclosure provides a method to process input/output (I/O) requests. The I/O requests are associated with one or more requests to write data to a storage object in a distributed storage system in a virtualized computing environment and one or more requests to delete data from a storage object in the distributed storage system in the virtualized computing environment. The requests to write data and the requests to delete data are destaged to buffer write I/Os in a logical queue and delete I/Os in the logical queue, respectively. A number of slots in the logical queue dedicated to buffer the delete I/Os may be adjusted so that the delete I/Os are efficiently handled.

In the disclosure, a "data write" may refer to a request to write data to a storage object in a distributed storage system in a virtualized computing environment. A "data delete" may refer to a request to delete data from a storage object in a distributed storage system in a virtualized computing environment. A "data write" may refer to a request to write data to a storage object in a distributed storage system in a virtualized computing environment. The term "destage" may refer to asynchronously write new or updated data or delete data from a faster cache tier storage to a slower capacity tier storage. A "data destage thread" may refer to a sequence of programmed instructions that can be managed independently by a scheduler to destage a data write. A "delete destage thread" may refer to a sequence of programmed instructions that can be managed independently by a scheduler to destage a data delete. A "bucket" is associated with a tag attached to a data write or a data delete to identify an order in time of the data write or the data delete, respectively.

Figure 1:
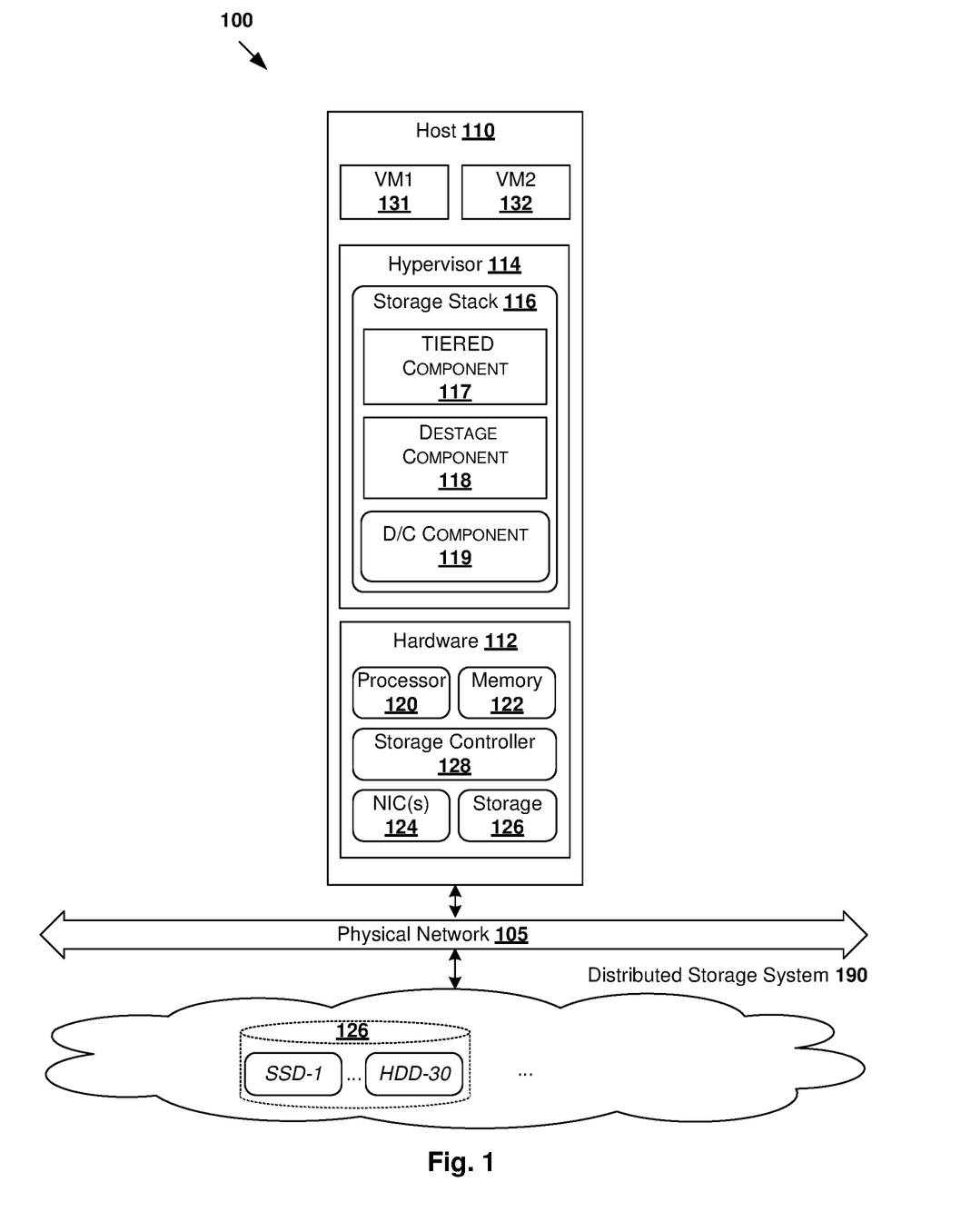
FIG. 1 is a schematic diagram illustrating an example virtualized computing environment that supports processing of one or more data writes and one or more data deletes, according to one or more embodiments of the present disclosure.

FIG. 1 is a schematic diagram illustrating an example virtualized computing environment 100 that supports processing of one or more data writes and one or more data deletes, according to one or more embodiments of the present disclosure. It should be understood that, depending on the desired implementation, virtualized computing environment 100 may include additional and/or alternative components than that shown in FIG. 1.

Virtualized computing environment 100 may include one or more hosts that are inter-connected via physical network 105. For simplicity, FIG. 1 only illustrates one host, host 110. Host 110 includes suitable hardware 112 and virtualization software (e.g., hypervisor 114) to support various virtual machines (VMs) 131 and 132. In practice, virtualized computing environment 100 may include any number of hosts (also known as a "host computers", "host devices", "physical servers", "server systems", "transport nodes," etc.), where each host may be supporting tens or hundreds of VMs.

It should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 114 may be implemented in any suitable virtualization technology, such as VMware ESX® or ESXi™ (available from VMware, Inc.), Kernel-based Virtual Machine (KVM), etc. Hypervisor 114 may also be a "type 2" or hosted hypervisor that runs on top of a conventional operating system on host 110.

Hypervisor 114 maintains a mapping between underlying hardware 112 and virtual resources allocated to respective VMs 131 and 132. Hardware 112 includes suitable physical components, such as central processing unit(s) or processor(s) 120; memory 122; physical network interface controllers (NICs) 124; storage resource(s) 126, storage controller(s) 128 to provide access to storage resource(s) 126, etc. Virtual resources are allocated to each VM to support a guest operating system (OS) and applications (not shown for simplicity). For example, corresponding to hardware 112, the virtual resources may include virtual CPU, guest physical memory (i.e., memory visible to the guest OS running in a VM), virtual disk, virtual network interface controller (VNIC), etc.

In practice, storage controller 128 may be any suitable controller, such as redundant array of independent disks (RAID) controller (e.g., RAID-0 or RAID-1 configuration), etc. Host 110 may include any suitable number of storage resources in the form of physical storage devices, drives or disks. Each physical storage resource may be housed in or directly attached to host 110. Example physical storage resources include solid-state drives (SSDs), Universal Serial Bus (USB) flash drives, hard disk drives (HDD), etc.

To implement Software-Defined Storage (SDS) in virtualized computing environment 100, host 110 and other hosts may be configured as a cluster. This way, all the hosts may aggregate their storage resources to form distributed storage system 190 that represents a shared pool of one or more storage resources 126. Distributed storage system 190 may employ any suitable technology, such as Virtual Storage Area Network (VSAN™) available from VMware, Inc. For example, host 110 and other hosts may aggregate respective storage resources into an "object store" (also known as a datastore or a collection of datastores). The object store represents a logical aggregated volume to store any suitable VM data relating to VMs 131 and 132, such as virtual machine disk (VMDK) objects, snapshot objects, swap objects, home namespace objects, etc. Any suitable disk format may be used, such as VM file system leaf level (VMFS-L), VSAN on-disk file system, etc. Distributed storage system 190 is accessible by host 110 via physical network 105.

In some embodiments, hypervisor 114 supports storage stack 116, which processes one or more data writes and one or more data deletes that it receives. Storage stack 116 may include tiered component 117, destage component 118 and deduplication and compression (D/C) component 119.

In some embodiments, in response to receiving an I/O request (e.g., data write or data delete), tiered component 117 is configured to prepare a corresponding entry in a logical block address (LBA) table.

In some embodiments, destage component 118 is configured to process entries of the LBA table. The LBA table is configured to store a mapping of a cache offset location (i.e., where data is residing) in the primary tier and a capacity offset location (i.e., where data needs to be persisted) in the secondary tier. Destage component 118 is configured to scan the LBA table and buffer the I/O requests in D/C component 119 based on the entries of the LBA table.

In some embodiments, D/C component 119 is configured to maintain a logical queue. Some slots in the logical queue are dedicated for one or more I/O write requests and other slots in the logical queue are dedicated for one or more I/O delete requests. D/C component 119 is configured to process a I/O request at a time from the logical queue and stores a deduplicated and compressed form of data associated with the I/O request at the capacity offset location in the secondary tier (e.g., HDD-30). Given that the logical queue has a fixed number of slots, the slots dedicated for the I/O write requests and the I/O delete requests are limited.

Figure 2:
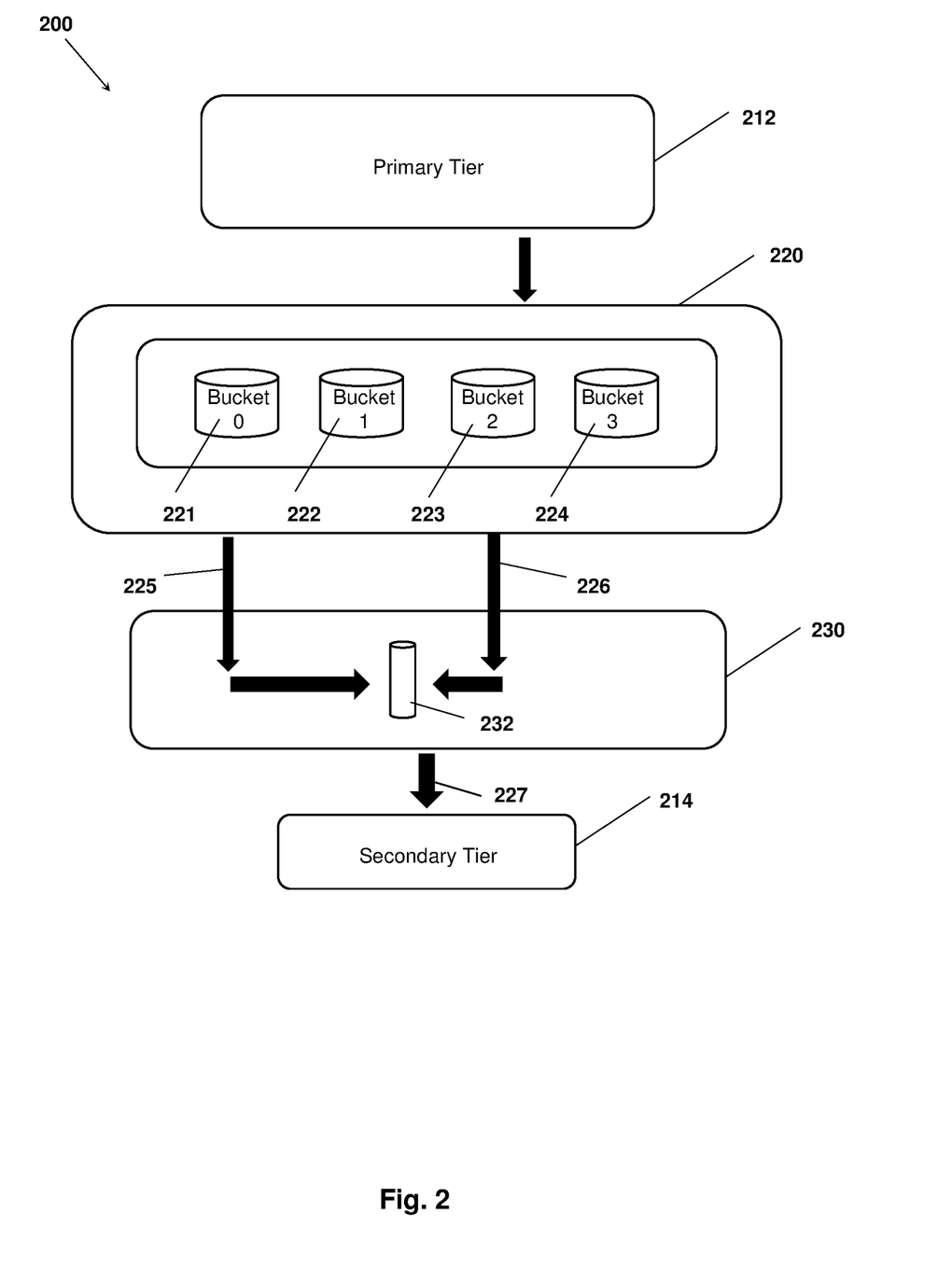
FIG. 2 is a schematic diagram illustrating an example storage stack that supports the processing of one or more data writes and one or more data deletes, according to one or more embodiments of the present disclosure.

FIG. 2 is a schematic diagram illustrating an example storage stack 200 that supports the processing of one or more data writes and one or more data deletes, according to one or more embodiments of the present disclosure. In some embodiments, storage stack 200 includes primary tier 212, secondary tier 214, destage component 220, and duplication and compression component (D/C) component 230. In some embodiments, in conjunction with FIG. 1, primary tier 212 and secondary tier 214 may correspond to tiered component 117, destage component 220 may correspond to destage component 118 and D/C component 230 may correspond to D/C component 119.

In some embodiments, in response to receiving an I/O request (e.g., data write or data delete), primary tier 212 is configured to prepare an entry (i.e., a row) of a logical block address (LBA) table. An example LBA table is listed in Table 1 below.

TABLE 1

| diskOffset | length | ssdOffset | isDelete | Bucket Id |
| --- | --- | --- | --- | --- |
| 00000 | 2K | 2048 | false | 0 |
| 010000 | 256K | 8096 | true | 0 |
| ... | ... | ... | ... | 0 |
| 02300000 | 64K | 524288 | true | 1 |
| 021000000 | 128K | 634277 | true | 1 |
| ... | ... | ... | ... | 1 |
| 022000000 | 1M | 2097152 | false | 2 |

In some embodiments, in Table 1, any row (entry) may correspond to an I/O request. For any row, column of "diskOffset" refers to a capacity offset location in secondary tier 214 of the I/O request, column of "length" refers to data size of the I/O request, column of "ssdOffset" refers to a cache offset location in primary tier 212 of the I/O request, and column of "isDelete" refers to a tag indicating whether the I/O request is a data delete. For example, "true" refers that this I/O request is a data delete and "false" refers that this I/O request is not a data delete and may be a data write.

In some embodiments, column of "Bucket Id" refers to an identification of a tag attached to the I/O request. The tag may refer to an order in time of the I/O request. For example, I/O requests tagged with "Bucket Id" of "0" is received by primary tier 212 earlier than I/O requests tagged with "Bucket Id" of "1." Similarly, I/O requests tagged with "Bucket Id" of "1" is received by primary tier 212 earlier than I/O requests tagged with "Bucket Id" of "2," I/O requests tagged with "Bucket Id" of "2" is received by primary tier 212 earlier than I/O requests tagged with "Bucket Id" of "3."

In some embodiments, incoming I/O requests received at primary tier 212 is firstly tagged with "Bucket Id" of "0." For illustration only, assuming destage component 220 including four buckets, in response to the received I/O requests reaches one-fourth data size of primary tier 212, additional I/O requests received at primary tier 212 may then be tagged with "Bucket Id" of "1." In response to the received I/O requests reaches another one-fourth data size of primary tier 212, additional I/O requests received at primary tier 212 may then be tagged with "Bucket Id" of "2." Similarly, in response to the received I/O requests reaches another one-fourth data size of primary tier 212, additional I/O requests received at primary tier 212 may then be tagged with "Bucket Id" of "3." In response to the received I/O requests reaches another one-fourth data size of primary tier 212, additional I/O requests received at primary tier 212 may be tagged with "Bucket Id" of "0" again. The above tagging of "Bucket Id" may then be repeated in response to receiving additional I/O requests.

In some embodiments, primary tier 212 is configured to transfer received I/O requests to destage component 220 for further processing. For example, primary tier 212 may be configured to prepare the LBA table set forth above and ingest the LBA table to destage component 220. Destage component 220 includes bucket-0 221, bucket-1 222, bucket-2 223 and bucket-3 224 to receive I/O requests tagged with "Bucket Id" of "0", "1", "2" and "3", respectively. It is important to note that only one bucket in destage component 220 receives incoming I/O requests from primary tier 212 at a point in time. This bucket may be referred to the "incoming I/O bucket."

In some embodiments, four buckets 221, 222, 223 and 224 in destage component 220 are for illustration only. Destage component 220 may include any number of buckets. In some embodiments, destage component 220 is configured to process I/O requests in buckets 221, 222, 223 and 224 (i.e., tagged with "Bucket Id" of "0", "1", "2" and "3", respectively) in a sequential order.

In some embodiments, destage component 220 includes a data destage thread configured to destage data writes in buckets 221, 222, 223 and 224 in a sequential order. For example, the data destage thread is configured to destage data writes pending in bucket 221 first, then data writes pending in bucket 222, then data writes pending in bucket 223, then data writes pending in bucket 224, and again data writes pending in bucket 221 and so on. A bucket that the data destage thread is currently destaging data writes in the bucket may be referred to the "write bucket."

In some embodiments, destage component 220 also includes a delete destage thread configured to destage data deletes in buckets 221, 222, 223 and 224 in a sequential order. For example, the delete destage thread is configured to destage data deletes pending in bucket 221 first, then data deletes pending in bucket 222, then data deletes pending in bucket 223, then data deletes pending in bucket 224, and again data deletes pending in bucket 221 and so on. A bucket that the delete destage thread is currently destaging data deletes in the bucket may be referred to the "delete bucket."

In some embodiments, it is important to note that the data destage thread and the data delete thread are being executed independently and concurrently. Therefore, the data destage thread may destage data writes pending in a bucket (e.g., bucket 221) and the data delete thread may destage data deletes pending in the same bucket (e.g., bucket 221) or different buckets (e.g., bucket 222, 223 or 224). In some embodiments, both of the data destage thread and the delete destage thread can only destage entries of the LBA table at least one bucket behind the incoming I/O bucket. For example, assuming the incoming I/O bucket is bucket 223, the data destage thread and the delete destage thread can destage I/O requests in buckets 221 and/or 222 (i.e., entries of the LBA table with "Bucket Id" of "0" or "1").

In some embodiments, the data destage thread is configured to destage data writes and buffer write I/Os 225 to D/C component 230. In some other embodiments, the delete destage thread is configured to destage data deletes and buffer delete I/Os 226 to D/C component 230.

In some embodiments, D/C component 230 is configured to insert write I/Os 225 and delete I/Os 226 to slots of logical queue 232. D/C component 230 is then configured to send I/Os in logical queue 232 to secondary tier 214 to persist data writes or data deletes in secondary tier 214.

However, given that logical queue 232 only has a limited number of slots, D/C component 230 is configured to dynamically adjust (i.e., increase or decrease) the number of slots dedicated for delete I/Os 226 to increase or decrease processing of data deletes based on some parameters. These parameters are further discussed in more details below. In some embodiments, the delete destage thread of destage component 220 is configured to track these parameters after sending a delete I/O 226 to D/C component 230 in response to a first data delete and before sending another delete I/O 226 to D/C component 230 in response to a second data delete.

In some embodiments, destage component 220 is configured to track total deletes pending in bytes (Td). Referring back to Table 1, an entry with "true" in "isDelete" is a data delete. Therefore, the second, fourth and fifth entries of Table 1 are associated with data deletes. Accordingly, Td is 448 Kbytes (i.e., 256 Kbytes+64 Kbytes+128 Kbytes).

In some embodiments, destage component 220 is also configured to track deletes pending in bytes in a bucket that the delete destage thread is currently destaging (Dp). Referring back to Table 1, assuming the delete destage thread is currently destaging data deletes in bucket-1 222, Dp is 192 Kbytes (i.e., 64 Kbytes+128 Kbytes).

In some embodiments, destage component 220 is also configured to track writes pending in bytes in a bucket that the data destage thread is currently destaging (Wp). Referring back to Table 1, assuming the data destage thread is currently destaging data writes in bucket-0 221, Wp is 2 Kbytes.

In some embodiments, assuming primary tier 212 implements a log structured filesystem including a log partition and a data partition, destage component 220 is also configured to track a space percentage usage of the log partition in primary tier 212 (Ls), a space percentage usage of the data partition in primary tier 212 (Ds) and a space percentage usage of secondary tier (Cs).

In some embodiments, destage component 220 is also configured to track the position of the incoming I/O bucket (Ib). Assuming the incoming bucket is bucket-2 223, Ib is 2. Similarly, destage component 220 is also configured to track the positions of the delete bucket (Db) and the write bucket (Wb). As set forth above, assuming the delete destage thread is currently destaging data deletes in bucket-1 222, Db is 1; and assuming the data destage thread is currently destaging data writes in bucket-0 221, Wb is 0.

In some embodiments, destage component 220 is configured to calculate a relative position between the incoming bucket and the bucket that the delete destage thread is currently destaging (RDb) and a relative position between the incoming bucket and the bucket that the write destage thread is currently destaging (RWb).

In some embodiments, RDb may be determined based on the following:

```
if (Db>Ib)
    RDb=Total number of buckets − Db + Ib
Else
    RDb=Ib − Db
```

As set forth above, the total number of buckets is 4, Db is 1 and Ib is 2. Then RDb=1 (i.e., 2-1).

In some embodiments, RWb may be determined based on the following:

```
if (Wb>Ib)
    RWb=Total number of buckets − Wb + Ib
Else
    RWb=Ib − Wb
```

As set forth above, the total number of buckets is 4, Wb is 0 and Ib is 2. Then RWb=2 (i.e., 2-0).

In some embodiments, in response to RDb is greater than RWb, it may refer to a scenario in which the processing of data deletes by the delete destage thread is behind the processing of data writes by the data destage thread. In this scenario, data deletes may be piled up and one or more Ls, Ds and Cs may excess a threshold. Therefore, the space percentage usage of primary tier 212 and/or the space percentage usage of secondary tier 214 may run out and impact I/O performances of storage stack 200. Accordingly, destage component 220 is configured to instruct D/C component 230 to dynamically adjust a number of slots in logical queue 232 dedicated for delete I/Os 226. In some embodiments, the number of slots in logical queue 232 may be dynamically adjusted based on the following:

capacityFullnessBasedOIO=minOIO+($Cs*Cs*$(maxOIO−minOIO))/(100*100);

max=MIN(100,(MAX($Ls,Ds$));

logOrDataSectionBasedOIO=(max*maxOIO)/100; and newOIO=MAX(capacityFullnessBasedOIO,logOrDataSectionBased).

In the above parameters, minOIO is a first constant and refers to the minimum slots that can be dedicated for delete I/Os 226 and maxOIO is a second constant and refers to the maximum slots that can be dedicated for delete I/Os 226. The parameter of capacityFullnessBasedOIO refers to a number of slots that can be dedicated for delete I/Os 226 in response to secondary tier 214 is full. Assuming minOIO is 1 slot, maxOIO is 101 slots and Cs is 60%, then capacityFullnessBasedOIO is 37 slots (i.e., 1+(60*60)*(101−1)/100*100=1+36=37).

In the above parameters, MIN( ) is a function that returns the minimum value and MAX( ) is a function that returns the maximum value. Assuming Ls is 65% and Ds is 70%, then the parameter of max is 70 (i.e., MIN(100,(MAX(65, 70)=MIN(100,70)=70). The parameter of logOrDataSectionBasedOIO refers to a number of slots that can be dedicated for delete I/Os 226 in response to the log partition of primary tier 212 or the data partition of primary tier 212 is full. Following the assumptions above, logOrDataSectionBasedOIO is 70 slots (i.e., (70*101)/100=70.7, only the integer is considered).

In some embodiments, following the assumptions above, newOIO is 70 slots (i.e., MAX(37,70)=70). The parameter of newOIO refers to an updated number of slots that is dedicated for delete I/Os 226 in response to RDb is greater than RWb to avoid one of Ls, Ds and Cs excesses a threshold. Therefore, destage component 220 is configured to instruct D/C component 230 to dynamically increase the number of slots in logical queue 232 dedicated for delete I/Os 226 to 70 slots according to the calculated newOIO.

In some embodiments, in response to RDb equals to RWb, it may refer to a scenario in which the delete destage thread and the data destage thread process data deletes and data writes in the same bucket, respectively. In this scenario, a number of slots in logical queue 232 is configured to dynamically dedicated for delete I/Os 226 generated by the delete destage thread based on a proportion of data deletes pending in the bucket so that the delete destage thread and the data destage thread may complete processing of data deletes and data writes, respectively, at a near time. In some embodiments, the number of slots in logical queue 232 may be dynamically adjusted based on the following:

capacityFullnessBasedOIO=minOIO+($Cs*Cs*$(maxOIO−minOIO))/(100*100);

RelativeDeletePct=($Dp*100$)/($Dp+Wp$);

deleteBasedOIO=(RelativeDeletePct*maxOIO)/100; and newOIO=MAX(capacityFullnessBasedOIO,deleteBasedOIO);

Following the assumptions above, capacityFullnessBasedOIO is 37 slots. The term of RelativeDeletePct refers to a proportion of data deletes pending in this bucket. In some embodiments, referring back to Table 1, assuming the data destage thread and the delete destage thread are both currently destaging data writes and data deletes in bucket-0 221, Dp is 256 Kbytes and Wp is 2 Kbytes, RelativeDeletePct is 99 (i.e., (256*100/(256+2)=99.2, only the integer is considered). Therefore, deleteBasedOIO=99 slots (i.e., (99*101)/100=99.99, only the integer is considered). Accordingly, newOIO is 99 slots (i.e., MAX(37,99)=99). The parameter of newOIO refers to an updated number of slots that is dedicated for delete I/Os 226 in response to RDb equals to RWb at bucket-0 221 set forth in Table 1 above.

In some embodiments, in response to RDb is less than RWb, it may refer to a scenario in which the processing of data deletes by the delete destage thread is ahead of the processing of data writes by the data destage thread. In this scenario, data deletes may still be piled up but only space percentage usage of secondary tier 214, instead of primary tier 212, may run out and impact I/O performances of storage stack 200. Accordingly, destage component 220 is configured to instruct D/C component 230 to dynamically adjust a number of slots in logical queue 232 dedicated for delete I/Os 226. In some embodiments, the number of slots in logical queue 232 may be dynamically adjusted based on the following:

capacityFullnessBasedOIO=minOIO+($C_s$*$C_s$*
    (maxOIO−minOIO))/(100*100); and newOIO=capacityFullnessBasedOIO In some embodiments, following the assumptions above, capacityFullnessBasedOIO is 37 slots. In addition, the parameter of newOIO is 37 slots which refers to an updated number of slots that is dedicated for delete I/Os 226 in response to RDb is less than RWb to avoid Cs excesses a threshold.

In sum, in some embodiments, storage stack 200 is configured to dynamically increase or decrease the number of slots dedicated for delete I/Os 226 to increase or decrease processing of data deletes based on a relative position between the incoming bucket and delete bucket, and a relative position between the incoming bucket and the write bucket.

Figure 3:
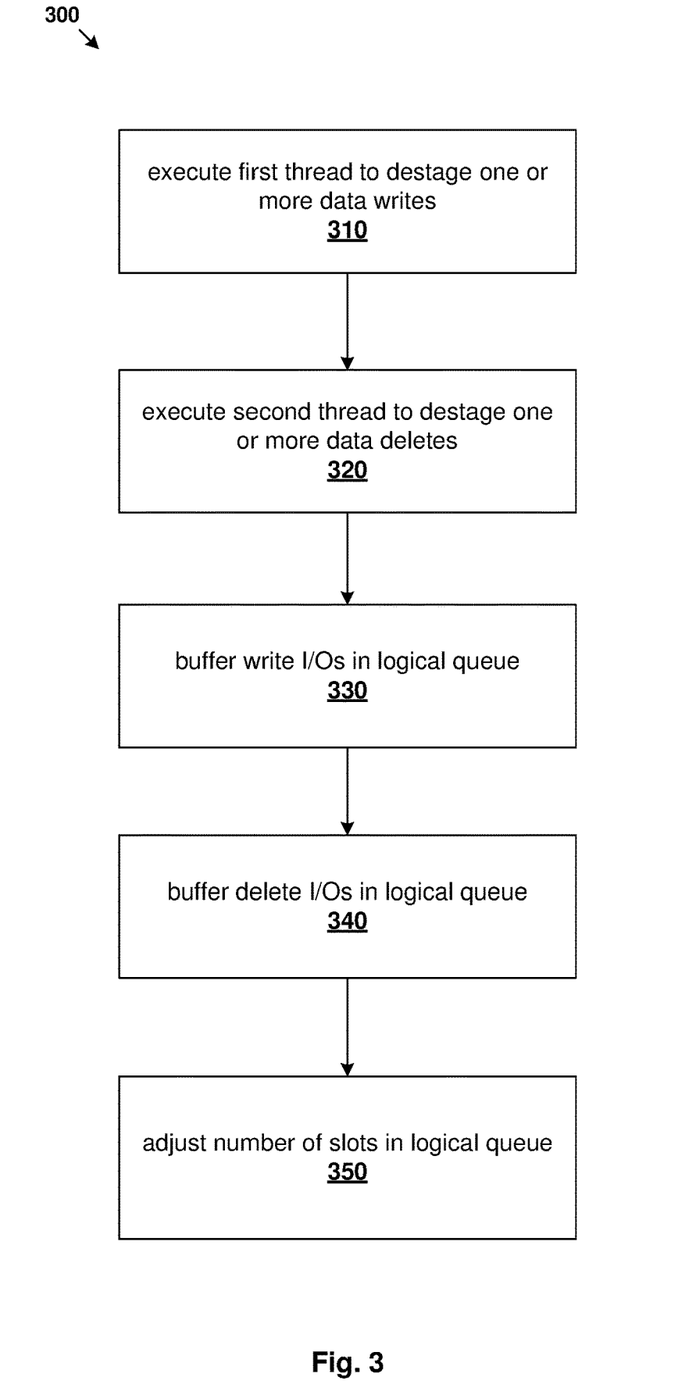
FIG. 3 is a flow diagram of an example method to process I/O requests including one or more data writes and one or more data deletes in a distributed storage system in a virtualized computing environment, according to one or more embodiments of the present disclosure.

FIG. 3 is a flow diagram of an example method 300 to process I/O requests including one or more data writes and one or more data deletes in a distributed storage system in a virtualized computing environment, according to one or more embodiments of the present disclosure. Example process 300 may include one or more operations, functions, or actions illustrated by one or more blocks, such as 310 to 350. The various blocks may be combined into fewer blocks, divided into additional blocks, and/or eliminated depending on the desired implementation. In some embodiments, process 300 may be performed by storage stack 200 illustrated in FIG. 2.

Process 300 may start with block 310 "execute first thread to destage one or more data writes." In some embodiments, the first thread corresponds to the data destage thread discussed above. In conjunction with FIG. 2, destage component 220 may be configured to execute the data destage thread to destage data writes in buckets 221, 222, 223 and 224 in a sequential order. Block 310 may be followed by block 320 "execute second thread to destage one or more data deletes."

In some embodiments, the second thread corresponds to the delete destage thread discussed above. In conjunction with FIG. 2, destage component 220 may be configured to execute the delete destage thread to destage data deletes in buckets 221, 222, 223 and 224 in a sequential order. Block 320 may be followed by block 330 "buffer write I/Os in logical queue."

In some embodiments, in conjunction with FIG. 2, in response to executing the data destage thread, destage component 220 is configured to buffer write I/Os 225 to logical queue 232 in D/C component 230. Block 330 may be followed by block 340 "buffer delete I/Os in logical queue."

In some embodiments, in conjunction with FIG. 2, in response to executing the delete destage thread, destage component 220 is configured to buffer delete I/Os 226 to the same logical queue 232. Block 340 may be followed by block 350 "adjust number of slots in logical queue."

In some embodiments, in conjunction with FIG. 2, D/C component 230 is configured to dynamically adjust a number of slots in logical queue 232 dedicated for delete I/Os 226. More specifically, the number of slots may be dynamically adjusted in various scenarios as discussed above. For example, a first scenario may be RDb greater than RWb, which may refer to the processing of data deletes by the delete destage thread is behind the processing of data writes by the data destage thread. A second scenario may be RDb equaling to RWb, which may refer to the delete destage thread and the data destage thread process data deletes and data writes in the same bucket, respectively. A third scenario may be RDb less than RWb, which may refer to the processing of data deletes by the delete destage thread is ahead of the processing of data writes by the data destage thread. Details of dynamically adjusting the number of slots in different three scenarios have been discussed above.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 3. For example, a computer system capable of acting as host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

The invention claimed is:

1. A method for processing input/output (I/O) requests including one or more data writes and one or more data deletes in a distributed storage system in a virtualized computing environment, comprising:
   executing a first thread to destage the one or more data writes, wherein the one or more data writes correspond to a first bucket;
   executing a second thread to destage the one or more data deletes, wherein the one or more data deletes correspond to a second bucket;
   in response to executing the first thread, buffering write I/Os associated with the one or more data writes in a logical queue;
   in response to executing the second thread, buffering delete I/Os associated with the one or more data deletes in the logical queue; and
   adjusting the number of slots in the logical queue dedicated to buffer the delete I/Os based on a relationship between the first bucket and the second bucket.

2. The method of claim 1, wherein the first thread and the second thread are executed concurrently.

3. The method of claim 1, wherein the second thread is configured to identify the one or more data deletes from a logical block address (LBA) table based on an identifier column of the LBA table.

4. The method of claim 1, further comprising, in response to the relationship that the first bucket is ahead of the second bucket, adjusting the number of slots in the logical queue dedicated to buffer the delete I/Os based on a space percentage usage of a log partition in a primary tier of the distributed storage system, a space percentage usage of a data partition in the primary tier of the distributed storage system, and a space percentage usage of a secondary tier of the distributed storage system.

5. The method of claim 1, further comprising, in response to the relationship that the first bucket and the second bucket are the same, adjusting the number of slots in the logical queue dedicated to buffer the delete I/Os based on a proportion of data deletes pending in the second bucket.

6. The method of claim 5, wherein the adjusting the number of slots in the logical queue dedicated to buffer the delete I/Os is further based on a space percentage usage of a secondary tier of the distributed storage system, delete I/Os pending in bytes in the second bucket and write I/Os pending in bytes in the second bucket.

7. The method of claim 1, further comprising, in response to the relationship that the first bucket is behind the second bucket, adjusting the number of slots in the logical queue dedicated to buffer the delete I/Os based on a space percentage usage of a secondary tier of the distributed storage system.

8. A non-transitory computer-readable storage medium that includes a set of instructions which, in response to execution by a processor of a computer system, cause the processor to perform a method for processing input/output (I/O) requests including one or more data writes and one or more data deletes in a distributed storage system in a virtualized computing environment, the method comprising:
   executing a first thread to destage the one or more data writes, wherein the one or more data writes correspond to a first bucket;
   executing a second thread to destage the one or more data deletes, wherein the one or more data deletes correspond to a second bucket;
   in response to executing the first thread, buffering write I/Os associated with the one or more data writes in a logical queue;
   in response to executing the second thread, buffering delete I/Os associated with the one or more data deletes in the logical queue; and
   adjusting a number of slots in the logical queue dedicated to buffer the delete I/Os based on a relationship between the first bucket and the second bucket.

9. The non-transitory computer-readable storage medium of claim 8, wherein the first thread and the second thread are executed concurrently.

10. The non-transitory computer-readable storage medium of claim 8, wherein the second thread is configured to identify the one or more data deletes from a logical block address (LBA) table based on an identifier column of the LBA table.

11. The non-transitory computer-readable storage medium of claim 8, including additional instructions which, in response to execution by the processor of the computer system, cause the processor to:
   in response to the relationship that the first bucket is ahead of the second bucket, adjust the number of slots in the logical queue dedicated to buffer the delete I/Os based on a space percentage usage of a log partition in a primary tier of the distributed storage system, a space percentage usage of a data partition in the primary tier of the distributed storage system, and a space percentage usage of a secondary tier of the distributed storage system.

12. The non-transitory computer-readable storage medium of claim 8, including additional instructions which, in response to execution by the processor of the computer system, cause the processor to:
   in response to the relationship that the first bucket and the second bucket are the same, adjust the number of slots in the logical queue dedicated to buffer the delete I/Os based on a proportion of data deletes pending in the second bucket.

13. The non-transitory computer-readable storage medium of claim 12, wherein the adjusting the number of slots in the logical queue dedicated to buffer the delete I/Os is further based on a space percentage usage of a secondary tier of the distributed storage system, delete I/Os pending in bytes in the second bucket and write I/Os pending in bytes in the second bucket.

14. The non-transitory computer-readable storage medium of claim 8, including additional instructions which, in response to execution by the processor of the computer system, cause the processor to:
   in response to the relationship that the first bucket is behind the second bucket, adjust the number of slots in the logical queue dedicated to buffer the delete I/Os based on a space percentage usage of a secondary tier of the distributed storage system.

15. A computer system configured to process input/output (I/O) requests including one or more data writes and one or more data deletes in a distributed storage system in a virtualized computing environment, comprising:
   a processor; and a non-transitory computer-readable medium having stored thereon instructions that, when executed by the processor, cause the processor to:
- execute a first thread to destage the one or more data writes, wherein the one or more data writes correspond to a first bucket;
- execute a second thread to destage the one or more data deletes, wherein the one or more data deletes correspond to a second bucket;
- in response to executing the first thread, buffer write I/Os associated with the one or more data writes in a logical queue;
- in response to executing the second thread, buffer delete I/Os associated with the one or more data deletes in the logical queue; and
- adjust a number of slots in the logical queue dedicated to buffer the delete I/Os based on a relationship between the first bucket and the second bucket.

16. The computer system of claim 15, wherein the first thread and the second thread are executed concurrently.

17. The computer system of claim 15, wherein the second thread is configured to identify the one or more data deletes from a logical block address (LBA) table based on an identifier column of the LBA table.

18. The computer system of claim 15, wherein the non-transitory computer-readable medium has stored thereon additional instructions that, when executed by the processor, cause the processor to:
- in response to the relationship that the first bucket is ahead of the second bucket, adjust the number of slots in the logical queue dedicated to buffer the delete I/Os based on a space percentage usage of a log partition in a primary tier of the distributed storage system, a space percentage usage of a data partition in the primary tier of the distributed storage system, and a space percentage usage of a secondary tier of the distributed storage system.

19. The computer system of claim 15, wherein the non-transitory computer-readable medium has stored thereon additional instructions that, when executed by the processor, cause the processor to:
- in response to the relationship that the first bucket and the second bucket are the same, adjust the number of slots in the logical queue dedicated to buffer the delete I/Os based on a proportion of data deletes pending in the second bucket.

20. The computer system of claim 19, wherein the adjusting the number of slots in the logical queue dedicated to buffer the delete I/Os is further based on a space percentage usage of a secondary tier of the distributed storage system, delete I/Os pending in bytes in the second bucket and write I/Os pending in bytes in the second bucket.

21. The computer system of claim 15, wherein the non-transitory computer-readable medium has stored thereon additional instructions that, when executed by the processor, cause the processor to:
- in response to the relationship that the first bucket is behind the second bucket, adjust the number of slots in the logical queue dedicated to buffer the delete I/Os based on a space percentage usage of a secondary tier of the distributed storage system.

* * * * *